United States Patent
Tanaka

(10) Patent No.: US 7,290,025 B2
(45) Date of Patent: Oct. 30, 2007

(54) CALCULATION METHOD FOR DIVISION OF DIGITAL DATA, CALCULATION APPARATUS FOR DIVISION OF DIGITAL DATA, AND PROGRAM THEREFOR

(75) Inventor: Nobuyuki Tanaka, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 572 days.

(21) Appl. No.: 10/138,312

(22) Filed: May 6, 2002

(65) Prior Publication Data

US 2002/0169814 A1  Nov. 14, 2002

(30) Foreign Application Priority Data

May 9, 2001   (JP)   ............... 2001-138434

(51) Int. Cl.
*G06F 7/535*   (2006.01)
(52) U.S. Cl. ..................................... 708/653
(58) Field of Classification Search ......... 708/650–653
See application file for complete search history.

(56) References Cited

U.S. PATENT DOCUMENTS

| 5,442,581 | A | * | 8/1995 | Poland | 708/653 |
| 5,777,917 | A | * | 7/1998 | Chung | 708/656 |
| 5,903,485 | A | * | 5/1999 | Bennett | 708/653 |
| 6,604,121 | B1 | * | 8/2003 | Ell et al. | 708/650 |

* cited by examiner

*Primary Examiner*—D. H. Malzahn
(74) *Attorney, Agent, or Firm*—Sughrue Mion Pllc.

(57) ABSTRACT

A calculation speed of division carried out in a computer is increased. Partitioning means partitions a dividend y that is a 32-bit digital datum at every 8 bits from the least significant bit to generate four bit blocks $y(1)$ to $y(4)$. For the respective bit blocks, table reference means finds solutions $z(1)$ to $z(4)$ obtained by dividing, by a divisor x, values expressed by replacing the bits other than the bits in each bit block with 0, while referring to tables (1) to (4) stored in storage means. Addition means adds all the solutions $z(1)$ to $z(4)$ to find the solution z.

16 Claims, 5 Drawing Sheets

FIG.2

TABLE (1)

| 0 | $Z(1) = 0 \div x$ |
|---|---|
| 1 | $Z(1) = 1 \div x$ |
| 2 | $Z(1) = 2 \div x$ |
| 3 | $Z(1) = 3 \div x$ |
| ⋮ | ⋮ |
| 254 | $Z(1) = 254 \div x$ |
| 255 | $Z(1) = 255 \div x$ |

FIG.3

TABLE (2)

| 0   | $Z(2) = 0 \times 2^8 \div x$   |
|-----|--------------------------------|
| 1   | $Z(2) = 1 \times 2^8 \div x$   |
| 2   | $Z(2) = 2 \times 2^8 \div x$   |
| 3   | $Z(2) = 3 \times 2^8 \div x$   |
| ⋮   | ⋮                              |
| 254 | $Z(2) = 254 \times 2^8 \div x$ |
| 255 | $Z(2) = 255 \times 2^8 \div x$ |

FIG.4

TABLE (3)

| 0 | $Z(3) = 0 \times 2^{16} \div x$ |
|---|---|
| 1 | $Z(3) = 1 \times 2^{16} \div x$ |
| 2 | $Z(3) = 2 \times 2^{16} \div x$ |
| 3 | $Z(3) = 3 \times 2^{16} \div x$ |
| ⋮ | ⋮ |
| 254 | $Z(3) = 254 \times 2^{16} \div x$ |
| 255 | $Z(3) = 255 \times 2^{16} \div x$ |

FIG.5

TABLE (4)

| 0 | $Z(4) = 0 \times 2^{24} \div x$ |
|---|---|
| 1 | $Z(4) = 1 \times 2^{24} \div x$ |
| 2 | $Z(4) = 2 \times 2^{24} \div x$ |
| 3 | $Z(4) = 3 \times 2^{24} \div x$ |
| ⋮ | ⋮ |
| 254 | $Z(4) = 254 \times 2^{24} \div x$ |
| 255 | $Z(4) = 255 \times 2^{24} \div x$ |

CALCULATION METHOD FOR DIVISION OF DIGITAL DATA, CALCULATION APPARATUS FOR DIVISION OF DIGITAL DATA, AND PROGRAM THEREFOR

BACKGROUND OF THE INVENTION

1. Field of the Invention

The present invention relates to a calculation method and a calculation apparatus using a computer. The present invention also relates to a program embodied on a computer readable medium that causes a computer to execute the calculation method.

2. Description of the Related Art

Various kinds of medical images such as X-ray images, RI images, CT (Computed Tomography) images, ultrasonic images, and MRI (Magnetic Resonance Imaging) images have been in wide use in the field of medicine. Furthermore, radiation image reading/recording systems (CR; Computed Radiography) using stimulable phosphor are also well known. Stimulable phosphor stores a portion of energy of radiation irradiated thereon, and emits a phosphorescent light in accordance with the stored radiation energy upon exposure to an excitation light such as a visible light or a laser beam. In a radiation image reading/recording system, radiation image information of a subject such as a human body is recorded in a stimulable phosphor sheet and the sheet is scanned with an excitation light such as a laser beam to cause the sheet to emit a phosphorescent light. The phosphorescent light is photoelectrically read to obtain an image signal.

In such a system, image processing such as tone processing and frequency processing is carried out on the image signal and a visible diagnostic image of an excellent diagnostic value (that is, an image easy to read) is recorded on a photosensitive material (such as a film), based on the image signal after the image processing. Alternatively, the image signal is displayed on a display device such as a CRT after being recorded temporarily in a recording medium. In this manner, the radiation image is reproduced and provided for diagnosis. Various kinds of image processing such as tone processing, frequency enhancement processing for emphasizing soft-tissue, bones, the mediastinum, and the like, soft-tissue or bone display processing using energy subtraction, and enlargement/reduction processing can be carried out as the image processing for reproduction of radiation image information regarding a human body.

In such image processing, operations including division, such as filtering processing and interpolation processing, is carried out a large number of times (for each pixel, for example). Therefore, a large amount of calculation is carried out. Especially, since medical images that need to be of high quality have a large amount of data, the amount of calculation also becomes extremely large.

However, a computing speed for the image processing described above depends on the performance capability of a computer inside an image processing apparatus. Therefore, in order to speed up the image processing, the computing speed of computers have been increased.

Unfortunately, only increasing the computing speed of a computer does not fundamentally solve the problem of operation speed, because the content of the image processing also becomes more complex for better processing in accordance with an increase in the computing speed.

Therefore, in order to speed up the image processing, an efficiency of the calculations carried out in the computer needs to be improved, in addition to increasing the computing speed.

A computing speed by a computer is generally much slower for division than for addition or subtraction. Therefore, in the image processing that often uses division repeatedly, the computing speed of division greatly influences an operation time necessary for the image processing. Consequently, fast division in a computer can lead to an increase in the image processing speed.

SUMMARY OF THE INVENTION

The present invention has been conceived based on consideration of the above circumstances. An object of the present invention is therefore to provide a calculation method and a calculation apparatus enabling fast division in a computer.

An calculation method of the present invention is a method of obtaining a solution z of division of a dividend y which is a digital datum of m bits ($m \geq 1$) by a divisor x by using a computer, and the calculation method comprises the steps of:

generating a table (i) corresponding to an $i^{th}$ lowest bit block among n bit blocks ($n \geq i \geq 1$) generated by partitioning m bits from the least significant bit at bit positions expressed by elements of a sequence $\{a_n\}$, the table relating values that can be expressed by the bits between an $(a_{i-1}+1)^{th}$ lowest bit and an $a_i^{th}$ lowest bit with solutions z(i) obtained by dividing, by the divisor x, values that can be expressed by the bits between the least significant bit and the $a_i^{th}$ lowest bit wherein the bits between the least significant bit and an $(a^{i-1})^{th}$ lowest bit are replaced with 0;

partitioning the dividend y as the digital datum of m bits into n bit blocks y(1) to y(n) at the bit positions expressed by the elements of the sequence $\{a_n\}$ from the least significant bit;

finding in the $i^{th}$ lowest bit block y(i) the solution z(i) obtained by dividing by the divisor x the value that is expressed by the bits of the dividend y between the least significant bit and the $a_i^{th}$ lowest bit wherein the bits between the least significant bit and the $(a_{i-1})^{th}$ lowest bit are replaced with 0, by referring to the table (i); and finding the solution z by adding the solutions z(i) found for the respective bit blocks.

"Partitioning the dividend y at bit positions expressed by elements of a sequence $\{a_n\}$" is carried out in the following manner. For example, if the sequence $\{a_n\}$ is expressed by a general term $a_n=8n$ (hereinafter referred to as Equation (1)) and if the dividend y is of 32 bits, $n \leq 4$. Therefore, the sequence $\{a_n\}$ comprises the elements 8, 16, 24, and 32. Consequently, the dividend y is partitioned into four bit blocks, namely a bit block from the least significant bit (hereinafter referred to as LSB) to the $8^{th}$ lowest bit, a bit block from the $9^{th}$ lowest bit to the $16^{th}$ lowest bit, a bit block from the $17^{th}$ lowest bit to the $24^{th}$ lowest bit, and a bit block from the $25^{th}$ lowest bit to the $32^{nd}$ lowest bit. The sequence $\{a_n\}$ is not limited to an arithmetic sequence such as the sequence expressed by the Equation (1) above, and any sequence can be used.

"Generating a table (i) corresponding to an $i^{th}$ lowest bit block among n bit blocks ($n \geq i \geq 1$) generated by partitioning m bits from the least significant bit at bit positions expressed by elements of a sequence $\{a_n\}$, the table relating values that can be expressed by the bits between an $(a_{i-1}+1)^{th}$ lowest bit and an $a_i^{th}$ lowest bit with solutions z(i) obtained by dividing, by the divisor x, values that can be expressed by the bits between the least significant bit and the $a_i{}^{th}$ lowest bit wherein the bits between the least significant bit and an $a_{i-1}{}^{th}$ lowest bit are replaced with 0" refers to preparing tables (1) to (4) in the case where 32 bits are partitioned by the sequence $\{a_n\}$ expressed by Equation (1), since $n \leq 4$ in this case. The number of bits to be partitioned for table generation is not necessarily the same as the number of bits in the dividend y, and can be any number equal to or greater than the number of bits of the dividend y.

In this case, the table (1) stores values from 0 to 255 that can be expressed by the bits from the LSB to the $8^{th}$ lowest bit in relation to the solutions $z(1)$ of the division of the values 0 to 255 by the divisor x. The table (2) stores the values from 0 to 255 that can be expressed by the bits from the $9^{th}$ lowest bit to the $16^{th}$ lowest bit in relation to the solutions $z(2)$ obtained by dividing, by the divisor x, values from $0 \times 2^8$ to $255 \times 2^8$ that can be expressed by replacing the bits from the LSB to the $8^{th}$ lowest bit among the bits from the LSB to the $16^{th}$ lowest bit with 0. The table (3) stores the values from 0 to 255 that can be expressed by the bits from the $17^{th}$ lowest bit to the $24^{th}$ lowest bit in relation to the solutions $z(3)$ obtained by dividing, by the divisor x, values from $0 \times 2^{16}$ to $255 \times 2^{16}$ that can be expressed by replacing the bits from the LSB to the $16^{th}$ lowest bit among the bits form the LSB to the $24^{th}$ lowest bit with 0. The table (4) stores the values from 0 to 255 that can be expressed by the bits from the $25^{th}$ lowest bit to the $32^{nd}$ lowest bit in relation to the solutions $z(4)$ obtained by dividing, by the divisor x, values from $0 \times 2^{24}$ to $255 \times 2^{24}$ that can be expressed by replacing the bits from the LSB to the $24^{th}$ lowest bit among the bits from the LSB to the $32^{nd}$ lowest bit with 0.

"Adding the solutions $z(i)$ found for the respective bit blocks" refers to adding all the solutions $z(1)$ to $z(n)$.

An calculation apparatus of the present invention is an apparatus for obtaining a solution z of division of a dividend y which is a digital datum of m bits ($m \geq 1$) by a divisor x by using a computer, and the calculation apparatus comprises:

storage means for storing a table (i) corresponding to an $i^{th}$ lowest bit block among n bit blocks ($n \geq i \geq 1$) generated by partitioning m bits from the least significant bit at bit positions expressed by elements of a sequence $\{a_n\}$, the table relating values that can be expressed by the bits between an $(a_{i-1}+1)^{th}$ lowest bit and an $a_i{}^{th}$ lowest bit with solutions $z(i)$ obtained by dividing, by the divisor x, values that can be expressed by the bits between the least significant bit and the $a_i{}^{th}$ lowest bit where in the bits between the least significant bit and an $(a_{i-1})^{th}$ lowest bit are replaced with 0;

partitioning means for partitioning from the least significant bit the dividend y as the digital datum of m bits into n bit blocks $y(1)$ to $y(n)$ at the bit positions expressed by the elements of the sequence $\{a_n\}$;

table reference means for finding, in the $i^{th}$ lowest bit block $y(1)$ partitioned by the partitioning means, the solution $z(i)$ obtained by dividing by the divisor x the value that is expressed by the bits of the dividend y between the least significant bit and the $a_i{}^{th}$ lowest bit wherein the bits between the least significant bit and the $(a_{i-1})^{th}$ lowest bit are replaced with 0, by referring to the table (i); and addition means for finding the solution z by adding the solutions $z(i)$ found for the respective bit blocks by the table reference means.

A program of the present invention is a program that causes a computer to execute the calculation method of the present invention for obtaining a solution z of division of a dividend y which is a digital datum of m bits ($m \geq 1$) by a divisor x. The computer stores a table (i) corresponding to an $i^{th}$ lowest bit block among n bit blocks ($n \geq i \geq 1$) generated by partitioning m bits from the least significant bit at bit positions expressed by elements of a sequence $\{a_n\}$, the table relating values that can be expressed by the bits between an $(a_{i-1}+1)^{th}$ lowest bit and an $a_i{}^{th}$ lowest bit with solutions $z(i)$ obtained by dividing, by the divisor x, values that can be expressed by the bits between the least significant bit and the $a_i{}^{th}$ lowest bit wherein the bits between the least significant bit and an $(a_{i-1})^{th}$ lowest bit are replaced with 0. The program comprises the procedures of:

partitioning the dividend y as the digital datum of m bits into n bit blocks $y(1)$ to $y(n)$ at the bit positions expressed by the elements of the sequence $\{a_n\}$ from the least significant bit;

finding, in the $i^{th}$ lowest bit block $y(i)$, the solution $z(i)$ obtained by dividing by the divisor x the value that is expressed by the bits of the dividend y between the least significant bit and the $a_i{}^{th}$ lowest bit wherein the bits between the least significant bit and the $(a_{i-1})^{th}$ lowest bit are replaced with 0, by referring to the table (i); and finding the solution z by adding the solutions $z(i)$ found for the respective bit blocks.

According to the calculation method and the calculation apparatus of the present invention, the time-consuming division calculation can be carried out by replacing the division calculation with the table reference operation and the addition calculation that can be carried out fast. In this manner, the division calculation can be carried out fast.

BRIEF DESCRIPTION OF THE DRAWINGS

FIG. 2 shows an example of table (1);
FIG. 3 shows an example of table (2);
FIG. 4 shows an example of table (3);
and
FIG. 5 shows an example of table (4).

DESCRIPTION OF THE PREFERRED EMBODIMENTS

Figure 1:
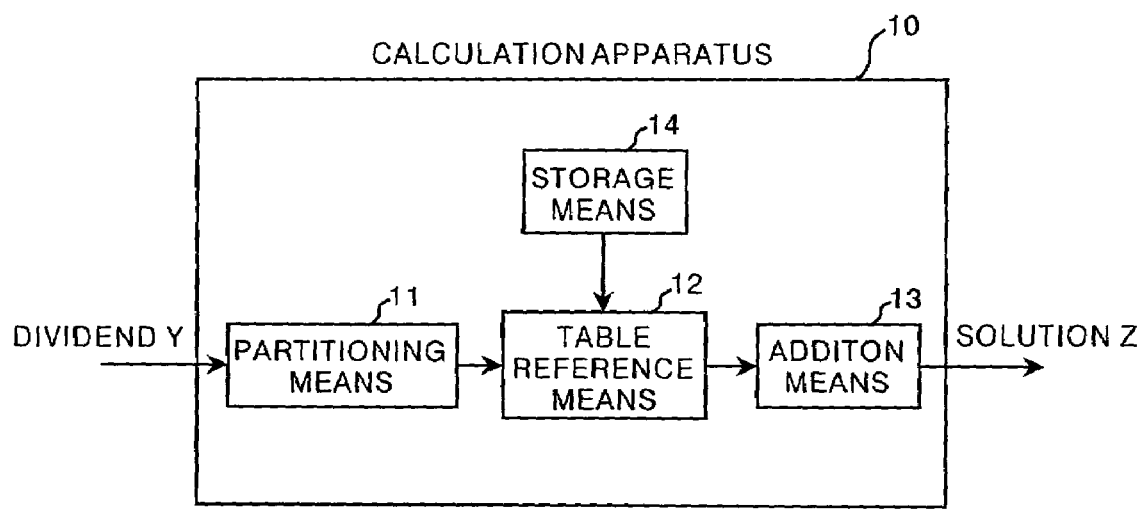
FIG. 1 is a block diagram showing a calculation apparatus of the present invention.

Hereinafter, embodiments of the present invention will be explained with reference to the accompanying drawings. FIG. 1 is a block diagram showing a calculation apparatus of a first embodiment of the present invention. In this embodiment, the calculation apparatus carries out division of a dividend y which is a digital datum of 32 bits by a divisor x.

An calculation apparatus 10 of this embodiment comprises partitioning means 11 for partitioning the 32-bit digital datum y into four bit blocks $y(1)$ to $y(4)$ by partitioning the 32 bits at every 8 bits from the LSB, table reference means 12 for finding in each bit block $y(n)$ solutions $z(1)$ to $z(4)$ obtained by dividing, by the divisor x, values that can be expressed by replacing the bits other than the bits belonging to each bit block with 0 with reference to the tables (1) to (4), addition means 13 for finding the solution z by adding the solutions $z(1)$ to $z(4)$, and storage means 14 for storing the tables (1) to (4).

The partitioning means 11, the table reference means 12, and the addition means 13 are realized by a processor such as a CPU and a program describing the processing therein.

The storage means 14 comprises a semiconductor memory such as a RAM and a ROM or a recording medium such as a hard disc. The storage means 14 stores the tables (1) to (4) shown in FIGS. 2 to 5, for example.

The table (1) stores values from 0 to 255 in relation to the solutions z(1) of division of the values 0 to 255 by the divisor x. The table (2) stores the values 0 to 255 in relation to the solutions z(2) of division of values from $0 \times 2^8$ to $255 \times 2^8$. The table (3) stores the values 0 to 255 in relation to the solutions z(3) of division of values from $0 \times 2^{16}$ to $255 \times 2^{16}$ by the divisor x. The table (4) stores the values 0 to 255 in relation to the solutions z(4) of division of values from $0 \times 2^{24}$ to $255 \times 2^{24}$ by the divisor x.

Instead of the tables (1) to (4), any table can be used as long as the table stores the values represented by each bit block y(n) generated by partitioning of the dividend y in relation to the solutions z(n) obtained by dividing by the divisor x values that can be expressed by replacing the bits other than the bits in each bit block with 0. Furthermore, the table may store solutions $z_1(n)$ to $z_n(n)$ of division by divisors $x_1$ to $X_n$.

The operation of the calculation apparatus of this embodiment having the above configuration will be explained next.

When the dividend y is input to the calculation apparatus 10, the partitioning means 11 partitions the dividend y at every 8 bits from the LSB to generate the bit blocks y(1) to y(4).

The table reference means 12 finds the solution z(1) obtained by dividing by the divisor x the value that is expressed by the bits in the bit block y(1), while referring to the table y(1) stored in the storage means 14. The table reference means 12 then finds the solution z(2) obtained by dividing by the divisor x the value that is expressed by replacing the bits other than the bits in the bit block y(2) with 0, while referring to the table y(2). The table reference means 12 also finds the solution z(3) obtained by dividing by the divisor x the value that is expressed by replacing the bits other than the bits in the bit block y(3) with 0, while referring to the table y(3). The table reference means 12 then finds the solution z(4) obtained by dividing by the divisor x the value that is expressed by replacing the bits other than the bits in the bit block y(4) with 0, while referring to the table y(4).

The addition means 13 adds all the solutions z(1), z(2), z(3), and z(4) obtained by the table reference means 12 to find the solution z.

According to the calculation method and the calculation apparatus having the above configuration, the time-consuming division calculation can be replaced with the table reference operation and the addition calculation that can be carried out fast. Therefore, the division calculation can be carried out fast.

In the calculation apparatus of the present invention, the dividend y is not necessarily limited to a value of 32 bits, and a datum of any bits can be used. Furthermore, the number of bits in each bit block of the dividend y and the number of bits in the values to be divided in advance in each table are not necessarily eight. As long as the bit number of the dividend and the number of bits in each bit block correspond to each other, any number can be used therefor.

A second embodiment of the present invention will be explained next. A calculation apparatus in the second embodiment has the same configuration as the calculation apparatus 10 in the first embodiment shown in FIG. 1. Therefore, in this embodiment, an apostrophe is added to each of the reference numbers in the first embodiment. An example in which a 32-bit digital datum y is divided by a divisor x will again be explained in this embodiment. In the second embodiment, processing in table reference means 12' and a table stored in storage means 14' are different from those in the first embodiment.

In this embodiment, the storage means 14' stores one table (c) that is commonly referred to for each bit block. The table (c) stores values from 0 to 255 in relation to solutions z(c) of division of the values 0 to 255 by the divisor x.

In order to find solution z(n) of division by the divisor x regarding each bit block y(n), the table reference means 12' finds the solution z(c) by referring to the table (c) for each bit block y(n), and then multiplies the solution z(c) by each value generated by using the number of bits lower than the lowest bit in each bit block y(n) as the exponent of 2. In this manner, the solutions z(n) are found for the respective bit blocks.

The operation of the calculation apparatus according to the second embodiment having the above configuration will be explained next.

The dividend y is input to an calculation apparatus 10' and partitioning means 11' partitions the dividend y at every 8 bits from the LSB to generate bit blocks y(1) to y(4).

In order to find the solution z(1) of division by the divisor x regarding the bit block y(1), the table reference means 12' obtains the solution z(c) of division of the value that is expressed by the bit block y(1) by the divisor x, while referring to the table (c) stored in the storage means 14'. The solution z(c) is used as the solution z(1).

In order to find the solution z(2) of division by the divisor x regarding the bit block y(2), the table reference means 12' obtains the solution z(c) of division of the value that is expressed by the bit block y(2) by the divisor x, while referring to the table (c). The solution z(c) is multiplied by $2^8$ to generate the solution z(2).

In order to find the solution z(3) of division by the divisor x regarding a bit block y(3), the table reference means 12' obtains the solution z(c) of division of the value that is expressed by the bit block y(3) by the divisor x, while referring to the table (c). The solution z(c) is multiplied by $2^{16}$ to generate the solution z(3).

In order to find the solution z(4) of division by the divisor x regarding a bit block y(4), the table reference means 12' obtains the solution z(c) of division of the value that is expressed by the bit block y(4) by the divisor x, while referring to the table (c). The solution z(c) is multiplied by $2^{24}$ to generate the solution z(4).

Addition means 13' adds all the solutions z(1), z(2), z(3), and z(4) to find the solution z.

By using the calculation apparatus having the above configuration, the same effect as in the first embodiment can be obtained. Furthermore, since only one table is referred to in order to find the solution of division by the divisor x regarding each bit block in the second embodiment, the need to provide a table for each bit block, as in the first embodiment, is obviated.

The number of bits in the dividend y is not necessarily limited to 32, and a datum of any bits can be used. Furthermore, the number of bits in each bit block of the dividend y and the number of bits in the values to be divided in advance in each table are not necessarily 8. As long as the both correspond to each other, any number can be used therefor.

With regard to a computer readable medium on which the program for causing a computer to execute the calculation method of the present invention, a skilled artisan would know that the computer readable medium is not limited to any specific type of storage device and includes any type of device, including but not limited to CD's, floppy disks, RAM's, ROM's, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language, and machine language.

What is claimed is:

1. A calculation apparatus for obtaining a solution z of division of a dividend y which is a digital datum of m bits (m≧1) by a divisor x by using a computer, the calculation apparatus comprising:

storage means for storing a table (i) corresponding to an $i^{th}$ lowest bit block among n bit blocks (n≧i≧1) generated by partitioning m bits from the least significant bit at bit positions expressed by elements of a sequence $\{a_n\}$, the table relating values that can be expressed by the bits between an $(a_{i-1}+1)^{th}$ lowest bit and an $a_i^{th}$ lowest bit with solutions z(i) obtained by dividing, by the divisor x, values that can be expressed by the bits between the least significant bit and the $a_i^{th}$ lowest bit wherein the bits between the least significant bit and an $(a_{i-1})^{th}$ lowest bit are replaced with 0;

partitioning means for partitioning from the least significant bit the dividend y that is the digital datum of m bits in to n bit blocks y(1) to y(n) at the bit positions expressed by the elements of the sequence $\{a_n\}$;

table reference means for finding, in the $i^{th}$ lowest bit block y(i) partitioned by the partitioning means, the solution z(i) obtained by dividing by the divisor x the value that is expressed by the bits of the dividend y between the least significant bit and the $a_i^{th}$ lowest bit wherein the bits between the least significant bit and the $(a_{i-1})^{th}$ lowest bit are replaced with 0, by referring to the table (i); and addition means for finding the solution z by adding the solutions z(i) found for the respective bit blocks by the table reference means.

2. A calculation method for faster processing of an image data represented by dividend y, by obtaining a solution z of division of the dividend y which is a digital datum of m bits (m≧1) by a divisor x by using a computer, the calculation method comprising the steps of:

generating a table (i) corresponding to an $i^{th}$ lowest bit block among n bit blocks (n≧i≧1) generated by partitioning m bits from the least significant bit at bit positions expressed by elements of a sequence $\{a_n\}$, the table relating values that can be expressed by the bits between an $(a_{i-1}+1)^{th}$ lowest bit and an $a_i^{th}$ lowest bit with solutions z(i) obtained by dividing, by the divisor x, values that can be expressed by the bits between the least significant bit and the $a_i^{th}$ lowest bit wherein the bits between the least significant bit and an $(a_{i-1})^{th}$ lowest bit are replaced with 0;

partitioning from the least significant bit the dividend y that is the digital datum of m bits into n bit blocks y(1) to y(n) at the bit positions expressed by the elements of the sequence $\{a_n\}$;

finding in the $i^{th}$ lowest bit block y (i) the solution z (i) obtained by dividing by the divisor x the value that is expressed by the bits of the dividend y between the least significant bit and the $a_i^{th}$ lowest bit wherein the bits between the least significant bit and the $(a_{i-1})^{th}$ lowest bit are replaced with 0, by referring to the table (i); and finding the solution z by adding the solutions z(i) found for the respective bit blocks; and filtering processing in image processing or interpolation processing in image processing, in accordance with the solution z of the division of the dividend y.

3. A calculation method for faster processing of an image data represented by dividend y, by obtaining a solution z of division of the dividend y which is a digital datum of m bits (m≧1) by a divisor x by using a computer, the calculation method comprising the steps of:

generating a table (i) corresponding to an $i^{th}$ lowest bit block among n bit blocks (n≧i≧1) generated by partitioning m bits from the least significant bit at bit positions expressed by elements of a sequence $\{a_n\}$, the table relating values that can be expressed by the bits between $(a_{i-1}+1)^{th}$ lowest bit and an $a_i^{th}$ lowest bit with solutions z(i) obtained by dividing, by the divisor x, values that can be expressed by the bits between the least significant bit and the $a_i^{th}$ lowest bit wherein the bits between the least significant bit and an $(a_{i-1})^{th}$ lowest bit are replaced with 0;

partitioning from the least significant bit the dividend y that is the digital datum of m bits into n bit blocks y(1) to y(n) at the bit positions expressed by the elements of the sequence $\{a_n\}$;

finding in the $i^{th}$ lowest bit block y (i) the solution z (i) obtained by dividing by the divisor x the value that is expressed by the bits of the dividend y between the least significant bit and the $a_i^{th}$ lowest bit wherein the bits between the least significant bit and the $(a_{i-1})^{th}$ lowest bit are replaced with 0, by referring to the table (i); and finding the solution z by adding the solutions z(i) found for the respective bit blocks; and performing one of tone processing of the image data, frequency enhancement processing for emphasizing soft-tissue, bones or mediastinum, soft-tissue or bone display processing using energy subtraction, and enlargement/reduction processing of the image data, in accordance with the solution z.

4. The calculation method as claimed in claims 2 or 3, wherein $a_n$ of the sequence $\{a_n\}$ comprises $a_n=jn$, where j is an integer.

5. The calculation method as claimed in claims 2 or 3, wherein the sequence $\{a_n\}$ comprises an arithmetic sequence.

6. The calculation method as claimed in claims 2 or 3, wherein $a_n$ of the sequence $\{a_n\}$ is such that the digital datum is partitioned at every b bits, wherein b is an integer.

7. The calculation method as claimed in claims 2 or 3, wherein the $(a_{i-1}1)^{th}$ lowest bit is less significant than the $(a^i)^{th}$ lowest bit in the $i^{th}$ lowest bit block.

8. The calculation method as claimed in claims 2 or 3, further comprising generating another table (ii) corresponding to $ii^{th}$ lowest bit block among n bit blocks (n≧ii≧1), wherein ii≠i.

9. A program embodied on a computer readable medium that causes a computer to execute a method for faster processing of an image data represented by dividend y, by obtaining a solution z of division of the dividend y which is a digital datum of in bits (m≧1) by a divisor x, the computer storing a table (i) corresponding to an $i^{th}$ lowest bit block among n bit blocks (n≧i≧1) generated by partitioning m bits from the least significant bit at bit positions expressed by elements of a sequence $\{a_n\}$, the table relating values that can be expressed by the bits between an $(a_{i-1}+1)$ th lowest bit and an $a_i^{th}$ lowest bit with solutions z(i) obtained by dividing, by the divisor x, values that can be expressed by the bits between the least significant bit and the $a_i^{th}$ lowest bit wherein the bits between the least significant bit and an $(a_{i-1})^{th}$ lowest bit are replaced with 0, the program comprising the procedures of:

partitioning the dividend y that is the digital datum of m bits into n bit blocks y(1) to y (n) at the bit positions expressed by the elements of the sequence $\{a_n\}$ from the least significant bit;

finding in the $i^{th}$ lowest bit block y(i) the solution z(i) obtained by dividing by the divisor x the value that is expressed by the bits of the dividend y between the least significant bit and the $a_i^{th}$ lowest bit wherein the bits between the least significant bit and the $(a_{i-1})^{th}$ lowest bit are replaced with 0, while referring to the table (i); and finding the solution z by adding the solutions z(i) found for the respective bit blocks; and filtering processing in image processing or interpolation processing in image processing, in accordance with the solution z of the division of the dividend y.

10. A program embodied on a computer readable medium that causes a computer to execute a method for faster processing of an image data represented by dividend y, by obtaining a solution z of division of the dividend y which is a digital datum of m bits ($m \geq 1$) by a divisor x, the computer storing a table (i) corresponding to an $i^{th}$ lowest bit block among n bit blocks ($n \geq i \geq 1$) generated by partitioning m bits from the least significant bit at bit positions expressed by elements of a sequence $\{a_n\}$, the table relating values that can be expressed by the bits between an $(a_{i-1}+1)$th lowest bit and an $a_i^{th}$ lowest bit with solutions z(i) obtained by dividing, by the divisor x, values that can be expressed by the bits between the least significant bit and the $a_i^{th}$ lowest bit wherein the bits between the least significant bit and an $(a^{i-1})^{th}$ lowest bit are replaced with 0, the program comprising the procedures of:

partitioning the dividend y that is the digital datum of m bits into n bit blocks y(1) to y (n) at the bit positions expressed by the elements of the sequence $\{a_n\}$ from the least significant bit; and finding in the $i^{th}$ lowest bit block y(i) the solution z(i) obtained by dividing by the divisor x the value that is expressed by the bits of the dividend y between the least significant bit and the $a_i^{th}$ lowest bit wherein the bits between the least significant bit and the $(a_{i-1})^{th}$ lowest bit are replaced with 0, while referring to the table (i); and finding the solution z by adding the solutions z(i) found for the respective bit blocks; and performing one of tone processing of the image data, frequency enhancement processing for emphasizing soft-tissue, bones or mediastinum, soft-tissue or bone display processing using energy subtraction, and enlargement/reduction processing of the image data, in accordance with the solution z.

11. A program embodied on a computer readable medium that causes a computer to execute a calculation method for faster processing of an image data represented by data of m bits, the program comprising the procedures of:

a) partitioning the data of m bits by bit positions expressed by elements of a sequence $\{a_n\}$, into n number of bit blocks y(1) to y(n), n being an integer;

b) generating a table (i) corresponding to block y(i), wherein i is an integer such that $1 \leq i \leq n$, the table (i) comprising values expressed by bits between a least significant bit and $a_i^{th}$ bit, wherein the bits between the least significant bit and $(a_{i-1})^{th}$ bit are replaced with 0;

c) calculating a solution z(i) by dividing each of the values in the table (i) by divisor x;

d) repeating operations a)-c) for all integer values of i to calculate solutions z(i) for all i; and e) determining solution z by summing the solutions z(i) for all i; and f) filtering processing in image processing or interpolation processing in image processing, in accordance with the solution z.

12. A program embodied on a computer readable medium that causes a computer to execute a calculation method for faster processing of an image data represented by data of m bits, the program comprising the procedures of:

a) partitioning the data of m by bit positions expressed by elements of a sequence $\{a_n\}$, into n number of bit blocks y(1) to y(n), n being an integer;

b) generating a table (i) corresponding to block y(i), wherein i is an integer such that $1 \leq i \leq n$, the table (i) comprising values expressed by bits between a least significant bit and $a_i^{th}$ bit, wherein the bits between the least significant bit and $(a_{i-1})^{th}$ bit are replaced with 0;

c) calculating a solution z(i) by dividing each of the values in the table (i) by divisor x;

d) repeating operations a)-c) for all integer values of i to calculate solutions z(i) for all i; and e) determining solution z by summing the solutions z(i) for all i; and f) performing one of tone processing of the image data, frequency enhancement processing for emphasizing soft-tissue, bones or mediastinum, soft-tissue or bone display processing using energy subtraction, and enlargement/reduction processing of the image data, in accordance with the solution z.

13. The calculation method of claims 11 or 12, wherein the data is partitioned at every b bits, wherein b is an integer.

14. A calculation method for faster processing of an image data represented by data of m bits, the method comprising:

a) partitioning the data of m bits by bit positions expressed by elements of a sequence $\{a_n\}$, into n number of bit blocks y(1) to y(n), n being an integer;

b) calculating a solution $z(c_i)$ by dividing each of values expressed by bit block y(i) by divisor x, wherein $1 \leq i \leq n$;

c) calculating a solution z(i) by multiplying $z(c_i)$ by $2^{(i-1) \cdot b}$, b being a block size in number of bits;

d) repeating operations a)-c) for all integer values of i, to calculate solutions z(i) for all i; and e) determining solution z by summing the solutions z(i) for all i; and f) filtering processing in image processing or interpolation processing in image processing, in accordance with the solution z.

15. A calculation method for faster processing of an image data represented by data of m bits, the method comprising:

a) partitioning the data of m bits by bit positions expressed by elements of a sequence $\{a_n\}$, into n number of bit blocks y(1) to y(n), n being an integer;

b) calculating a solution $z(c_i)$ by dividing each of values expressed by bit block y(i) by divisor x, wherein $1 \leq i \leq n$;

c) calculating a solution z(i) by multiplying $z(c_i)$ by $2^{(i-1) \cdot b}$, b being a block size in number of bits;

d) repeating operations a)-c) for all integer values of i, to calculate solutions z(i) for all i; and e) determining solution z by summing the solutions z(i) for all i; and f) performing one of tone processing of the image data, frequency enhancement processing for emphasizing soft-tissue, bones or mediastinum, soft-tissue or bone display processing using energy subtraction, and enlargement/reduction processing of the image data, in accordance with the solution z.

16. The calculation method of claims 14 or 15, wherein the data is partitioned at every b bits, wherein b is an integer.

* * * * *